(12) United States Patent
Oh

(10) Patent No.: US 8,255,583 B2
(45) Date of Patent: Aug. 28, 2012

(54) DIGITAL INTERFACE SYSTEM TO SUPPORT ETHERNET AND CABLE CONNECTION STATE DISPLAYING METHOD THEREOF

(75) Inventor: Sung Bo Oh, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 12/765,032

(22) Filed: Apr. 22, 2010

(65) Prior Publication Data

US 2011/0051002 A1  Mar. 3, 2011

(30) Foreign Application Priority Data

Aug. 31, 2009  (KR) .............................. 10-2009-81338

(51) Int. Cl.
  *G06F 3/00*  (2006.01)
(52) U.S. Cl. ............................................. 710/15; 710/8
(58) Field of Classification Search .................. None
  See application file for complete search history.

(56) References Cited

U.S. PATENT DOCUMENTS

| 7,352,289 | B1 | 4/2008 | Harris |
| 2006/0095623 | A1* | 5/2006 | Nio et al. ...................... 710/260 |
| 2009/0091656 | A1 | 4/2009 | Kitaru et al. |
| 2009/0201421 | A1 | 8/2009 | Mawatari et al. |

FOREIGN PATENT DOCUMENTS

EP  2090955 A1 *  8/2009

OTHER PUBLICATIONS

European Search Report issued Dec. 6, 2010 in EP Application No. 10162473.2.

* cited by examiner

*Primary Examiner* — Chun-Kuan Lee
*Assistant Examiner* — Dayton Lewis-Taylor
(74) *Attorney, Agent, or Firm* — Stanzione & Kim, LLP

(57) ABSTRACT

A digital interface system to display an inappropriate connection state of a digital interface (High-Definition Multimedia Interface (HDMI) in an HDMI connection supporting an Ethernet function and a cable connection state displaying method therefore. When a user intends to use the Ethernet function by connecting the HDMI cable, the inappropriate connection of the HDMI cable is displayed on a screen by a message or a diagram. Also, in case of a plurality of connected HDMI cables, the position of an inappropriate HDMI cable is indicated on the screen. Even though it is difficult to distinguish a general HDMI cable from an HDMI with HDMI Ethernet and Audio Return Channel (HEAC) cable, an inappropriate HDMI cable connection is accurately identified.

8 Claims, 9 Drawing Sheets

FIG. 2

| Pin | Signal Name |
| --- | --- |
| 1 | TMDS Data2+ |
| 2 | TMDS Data2 Shield |
| 3 | TMDS Data2− |
| 4 | TMDS Data1+ |
| 5 | TMDS Data1 Shield |
| 6 | TMDS Data1− |
| 7 | TMDS Data0+ |
| 8 | TMDS Data0 Shield |
| 9 | TMDS Data0− |
| 10 | TMDS Clock+ |
| 11 | TMDS Clock Shield |
| 12 | TMDS Clock− |
| 13 | CEC |
| 14 | HEAC |
| 15 | SCL |
| 16 | SDA |
| 17 | DDC/CEC Ground |
| 18 | +5V Power |
| 19 | HPD(Hot Plug Detect) |

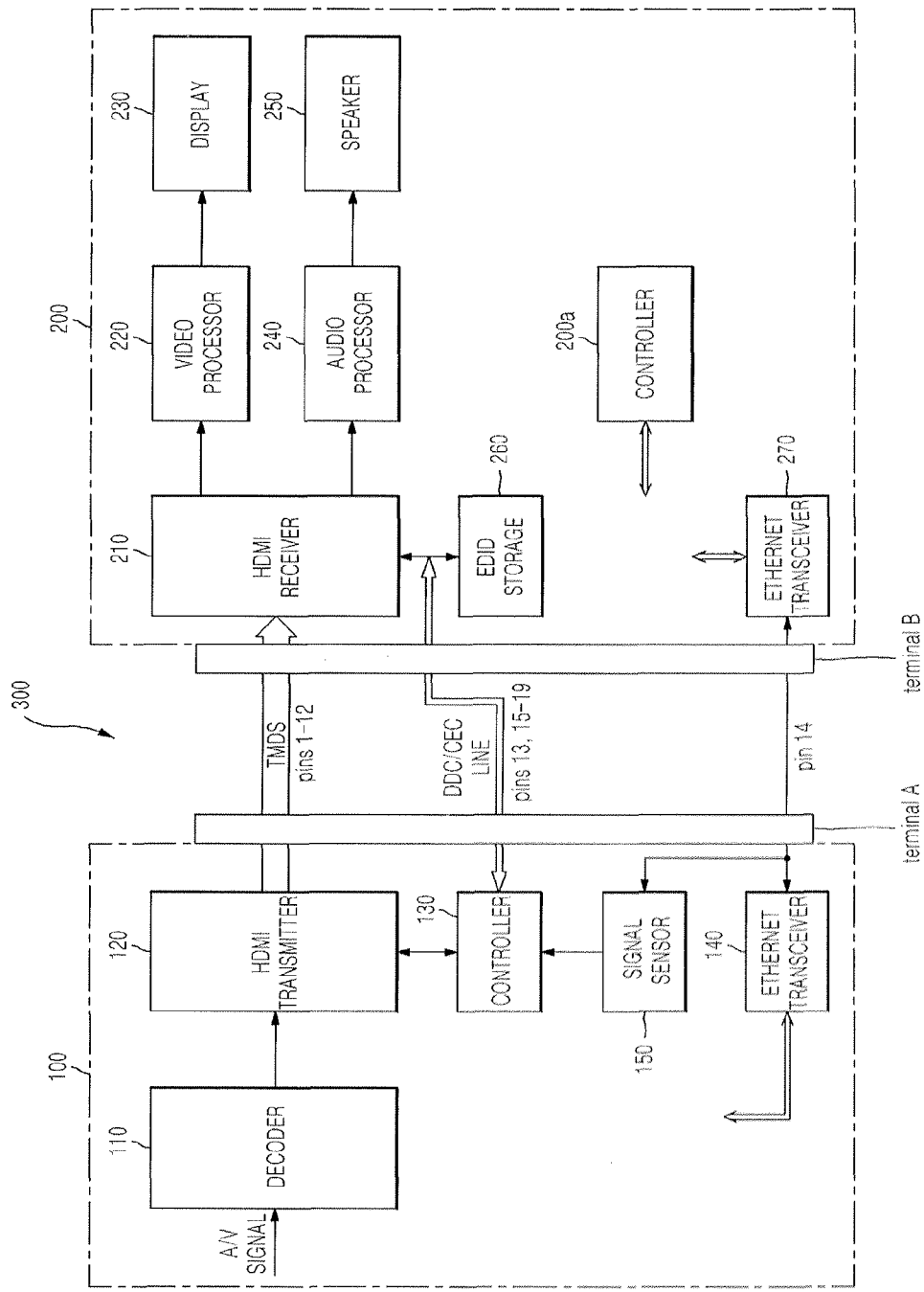

DIGITAL INTERFACE SYSTEM TO SUPPORT ETHERNET AND CABLE CONNECTION STATE DISPLAYING METHOD THEREOF

CROSS-REFERENCE TO RELATED APPLICATIONS

This application claims priority under 35 U.S.C. §119 from Korean Patent Application No. 2009-81338, filed on Aug. 31, 2009 in the Korean Intellectual Property Office, the disclosure of which is incorporated herein by reference.

BACKGROUND

1. Field of the Invention

Embodiments of the present general inventive concept relate to a digital interface system to display a connection state of a digital interface cable in a digital cable connection to support an Ethernet function and a cable connection state displaying method thereof.

2. Description of the Related Art

As digital contents have recently been popular, more users connect a multimedia source device that provides digital contents, such as a camcorder, a DVD player, a PlayStation 3 (PS3), a set top box, or the like, to a video device that processes and displays digital contents received from the multimedia source device, such as a monitor, a digital TV, etc.

As a digital interface for data transmission between the multimedia source device and the video device, a High Definition Multimedia Interface (HDMI) has been standardized. The HDMI, which is a broadcasting standardization to protect digital contents in a high-definition video device, is a multimedia interface to transmit uncompressed digital audio and video an integrated manner.

In general, the multimedia source device and the video device are connected via an HDMI, for data transmission. This HDMI connection does not support an Ethernet function. Since an HDMI cable has pin 14 reserved, no conductor is connected to the internal pin of the HDMI cable. Therefore, a user should use an additional cable to use the Ethernet function via the HDMI. However, it is difficult to distinguish the additional cable from a standard HDMI cable because they look alike. When the user intends to use the Ethernet function by connecting the HDMI cable and the Ethernet function does not work, he should identify the cause of the Ethernet failure.

SUMMARY

The present general inventive concept provides a digital interface system to display an inappropriate connection state of an HDMI cable in an HDMI connection to support an Ethernet function so that a user may recognize the inappropriate connection state of the HDMI cable, and a cable connection state displaying method thereof.

Additional aspects of the present general inventive concept will be set forth in part in the description which follows and, in part, will be obvious from the description, or may be learned by practice of the present general inventive concept.

The present general inventive concept may be achieved by providing a method to display a cable connection state in a digital interface system, the method including supporting Ethernet communication by connecting a source device to a video device by a digital interface cable, determining whether the digital interface cable is appropriate by sensing a signal from an Ethernet communication line of the digital interface cable, and displaying a connection state of the digital interface cable, if the digital interface cable is not appropriate.

The Ethernet communication line may be a $14^{th}$ pin of the digital interface cable.

If the Ethernet communication is failed, it may be determined whether a digital signal is sensed from the $14^{th}$ pin by analyzing a signal waveform of the $14^{th}$ pin.

If the digital signal is not sensed from the $14^{th}$ pin, it may be determined that the digital interface cable is inappropriate.

If a single source device is used, a message prompting a user to replace the digital interface cable with another digital interface cable or to check a connection of the digital interface cable may be displayed on the video device.

If a plurality of source devices are used, a connection diagram indicating connection states, device types, and names of the plurality of source devices may be displayed using Consumer Electronics Control (CEC) information, a Source Product Description (SPD) infoframe, and Extended Display Identification Data (EDID) information of each of digital interface devices connected to the plurality of source devices.

The position of the inappropriate digital interface cable may be indicated in the connection diagram.

The present general inventive concept may also be achieved by providing a digital interface system including a digital interface cable to support Ethernet communication by connecting a source device to a video device, a signal sensor provided in the source device to sense a signal from an Ethernet communication line of the digital interface cable, and a controller to determine whether the digital interface cable is not appropriate according to the signal sensed from the Ethernet communication line, and to control a connection state of the digital interface cable to be displayed if the digital interface cable is not appropriate.

If the Ethernet communication is failed, the controller may determine whether the $14^{th}$ pin is connected to an Ethernet by checking whether a digital signal is sensed from the $14^{th}$ pin.

If the digital signal is not sensed from the $14^{th}$ pin, the controller may determine that the $14^{th}$ pin is not connected to an Ethernet.

If a single source device is used, the controller may control displaying of a message prompting a user to replace the digital interface cable with another digital interface cable or to check a connection of the digital interface cable on the video device.

If a single source device or a plurality of source devices are used, when a user attempts to use an Ethernet communication function or activates the Ethernet communication function, the controller may control a message requesting replacement or connection check of an inappropriate digital interface cable to be displayed on the video device.

If a single source device or a plurality of source devices are used, when a user turns on a device, the controller may turn on the device after transmitting a test signal through an Ethernet to determine whether a digital interface cable is appropriately connected and confirm that the display is also power-on. Then when the user tries to use the device, the controller may control a message requesting replacement or connection check of an inappropriate digital interface cable to be displayed on the video device.

If a plurality of source devices are used, the controller may determine a connection diagram indicating connection states, device types, and names of the plurality of source devices using CEC information, an SPD infoframe, and EDID information of each of digital interface devices connected to the plurality of source devices.

The controller may control the position of the inappropriate digital interface cable to be displayed in the connection diagram on the video device.

The present general inventive concept may also be achieved by providing a digital interface system including a source device having a terminal unit having a plurality of terminals, a signal sensor connected to a fourteenth pin of the terminals of the terminal unit to detect a signal, and a controller to generate a signal corresponding to the detected signal.

The digital interface system may further include a cable having a plurality of pins connectable to corresponding terminals of the terminal unit, the plurality of pins having a fourteenth pin to transmit the signal representing a characteristic of the cable. The signal sensor may detect the signal transmitted through the fourteenth pin of the cable and determine the characteristic of the cable for Ethernet.

The controller may be connectable to an external device through a cable to form Ethernet, and the external device may transmit the signal to the fourteenth pin of the terminal unit.

The controller may generate the signal to display an image representing that a cable transmitting the signal is an Ethernet-ready cable or a non Ethernet-ready cable.

BRIEF DESCRIPTION OF THE DRAWINGS

These and/or other aspects of the present general inventive concept will become apparent and more readily appreciated from the following description of the embodiments, taken in conjunction with the accompanying drawings of which:

FIG. 2 is a specification diagram of an HDMI cable to support Ethernet according to an embodiment of the present general inventive concept;

FIG. 3 is a control block diagram of the HDMI system to support Ethernet according to an embodiment of the present general inventive concept;

DETAILED DESCRIPTION OF THE EMBODIMENTS

Figure 1:
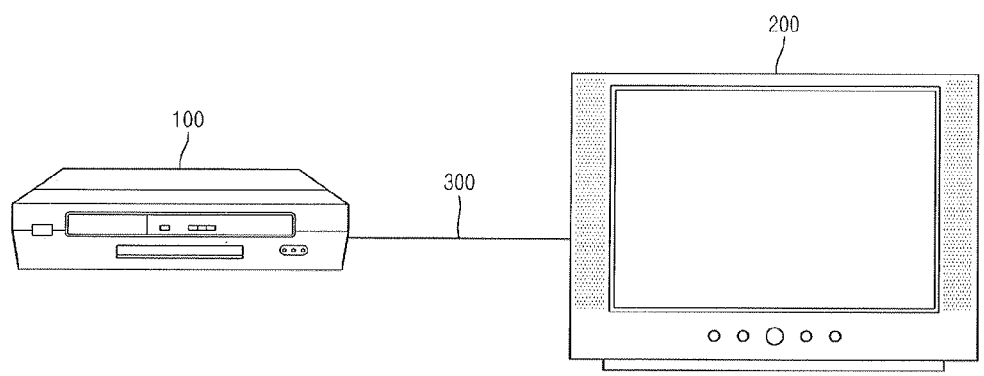
FIG. 1 is a mimetic diagram illustrating an HDMI system to support Ethernet according to an embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

FIG. 1 illustrates a High Definition Multimedia Interface (HDMI) system to support Ethernet according to an embodiment of the present general inventive concept.

Referring to FIG. 1, the HDMI system may include a source device 100, a video device 200, and an HDMI cable. The source device 100 may provides digital contents to the video device 200, and the video device may receive the digital contents, process the received digital contents through the HDMI cable 300, and display an image corresponding to processed digital contents.

The source device 100 is a multimedia transmitter to transmit digital content data to the video device 200 via the HDMI cable 300. The multimedia transmitter may be a camcorder, a digital camera, a DVD player, a Blueray Disc (BD) player, a PlayStation 3 (PS3), a set top box, a mobile phone, or the like. In general, before transmitting data (or the digital content date) to the video device 200, the source device 100 accesses the video device 200 via an I²C line of the HDMI cable 300 and reads device information about the video device 200. The device information indicates information about resolution and an audio format of the video device 200, so that data is output and received in the form of video or audio. In this manner, the source device 100 reads the device information about the video device 200, processes data according to the resolution and the audio format, and transmits the processed data to the video device 200.

The video device 200 is a receiver that receives data from the source device 100 and displays the received data. The video device may be a monitor, a High-Definition TV (HDTV), or the like.

The HDMI cable 300 is a digital interface cable that connects the source device 100 to the video device 200 so that data is transmitted therebetween. The HDMI cable 300 includes three independent communication channels, for example, Transition Minimized Differential Signaling (TMDS), Display Data Channel (DDC), and Consumer Electronics Control (CEC), to thereby transmit and receive Audio/Video (NV) data, device information, and control commands between the source device 100 and the video device 200.

FIG. 2 is a specification diagram of the HDMI cable to support Ethernet according to an embodiment of the present general inventive concept.

In FIG. 2, the HDMI cable 300 includes 19 pins and a function allocated to each pin is described hereinafter.

As noted from FIG. 2, the HDMI cable 300 according to the embodiment of the present general inventive concept is standardized to support an HDMI Ethernet and Audio Return Channel (HEAC) function which is added with or includes an HDMI Ethernet Channel (HEC) function and an Audio Return Channel (ARC) function, as pin 14, which is conventionally reserved, is updated to a new version, for example, a version 1.4 to correspond to the HEAC function.

The HDMI cable 300 may include the pins 1-12 assigned to transmit data, for example, TMDS Data 2+, TMDS Data 2 Shield, TMDS Data 2−, TMDS Data 1+, TMDS Data 1 shield, TMDS Data 1−, TMDS Data0+, TMDS Data0 Shield, YMDS Data0−, TMDS Clock+, TMDS clock Shield, and TMDS Clock−, respectively, to correspond to a TMDS function. The HDMI cable 300 may also include the pin 13 assigned to transmit data, for example, CEC to corresponding to a CEC function. The HDMI cable 300 may also include the pin 14 assigned to transmit data, for example, HEAC data to corresponding to the HEAC function. The HDMI cable 300 may also include the pins 15-19 assigned to transmit data, for example, SCL, SDA, DDC/CEC Ground, +5V power, and HPD (hot pug detect), respectively, which can be used to perform the above-describe functions with data transmitted with the above described pins.

FIG. 3 is a control block diagram of the HDMI system to support Ethernet according to an embodiment of the present general inventive concept.

Referring to FIG. 3, the source device 100 includes a decoder 110, an HDMI transmitter 120, a controller 130, an Ethernet transceiver 140, and a signal sensor 150.

The decoder 110 decodes a digital NV signal received from a DVD or a set top box and outputs the decoded signal.

The HDMI transmitter 120 transmits the decoded digital A/V data received from the decoder 110 in the form of a signal suitable for the HDMI. Having an internal Transition Minimized Differential Signaling (TMDS) encoder, the HDMI transmitter 120 converts the decoded data to a format transmittable from the HDMI by TMDS encoding and transmits the TMDS-coded data to the video device 200 via the HDMI cable 300.

The controller 130 is a Central Processing Unit (CPU) to read data format (Extended Display Identification Data (EDID)) information for identification of the video device 200 via a DDC/CEC line, when the HDMI cable 300 is connected to the source device 100. The controller 130 monitors whether the HDMI cable 300 is connected to the video device 200 by checking a communication state of the DDC/CEC line and a state of a Hot Plug signal. Upon detection of the connection of the HDMI cable 300 to the video device 200, the controller 130 controls an output port to be automatically set to HDMI.

The Ethernet transceiver 140 conducts Ethernet communication with the video device 200 via the HDMI cable.

If the Ethernet communication via the HDMI cable 300 is failed, the signal sensor 150 determines whether a high/low digital signal, namely a square wave signal has been sensed at pin 14 being an Ethernet communication line of the HDMI cable 300 by analyzing the shape of a signal at pin 14, determines whether pin 14 is currently connected to an Ethernet based on the shape of the signal, and notifies the controller 130 of the determination result. The signal sensor 150 may use a coupling capacitor to eliminate a DC level, in order to sense the digital signal only.

The video device 200 includes an HDMI receiver 210 being a counterpart of the HDMI transmitter 120, a video processor 220, a display 230, an audio processor 240, a speaker 250, an EDID storage 260, and an Ethernet transceiver 270.

The HDMI receiver 210 receives a digital A/V signal from the HDMI transmitter 120 of the source device 100. Having an internal TMDS decoder, the HDMI receiver 210 TMDS-decodes an HDMI signal of the format transmittable from the HDMI.

The video processor 220 processes a digital video signal received from the HDMI receiver 210 and outputs the processed digital video signal to the display 230. The audio processor 240 processes a digital audio signal received from the HDMI receiver 210 and outputs the processed audio signal through the speaker 250.

The EDID storage 260 is an Electrically Erasable Programmable Read Only Memory (EEPROM) to store EDID data. EDID is a data format developed by the Video Electronics Standards Association (VESA) and the EDID data is display characteristic information data that includes information about a manufacturer or dimensions, basic display parameters such as a supported resolution and a color format, characteristic information, etc. This EDID data is stored in the EEPROM during fabrication of the video device 200.

The Ethernet transceiver 270 is connected to the source device 100 by the HDMI cable 300, for Ethernet communication.

Referring to FIGS. 2 and 3, the source device 100 may have a first terminal unit A having a plurality of terminals to correspond to the respective pins 1-19, and the video source 200 may have a second terminal unit having a plurality of terminals to correspond to the respective pins 1-19. The HDMI cable 300 may have opposite pins 1-19 and conductive lines connected between the corresponding opposite pins 1-19. The opposite pins 1-19 are disposed opposite to each other with respect to the corresponding conductive lines, and are connected to the corresponding terminals of the first terminal unit A and the second terminal unit B.

The pins 1-12 are connected to the corresponding terminals of the first and second terminal units A and B to transmit data for the HEAC function. The pins 13 and 15-19 are connected to the corresponding terminals of the first and second terminals A and B to perform the above-described corresponding function. The opposite pins 14 of the HDMI cable 300 are connected to the corresponding terminals of the first and second terminal units A and B to transmit data or signal for the Ethernet function of the source device 100 and the video device 200. Data or signals transmitted through pins 1-12 can be used together with data or signals transmitted through pins 13 and 15-19 to perform corresponding functions, for example, processing video and audio signals in the video and audio processors 220 and 240 and to display an image on the display 230 and to generate sound through the speaker 250.

The Ethernet transceiver 140 may communicate with the controller 130 to transmit data or signal to correspond to the Ethernet function, and the Ethernet transceiver 270 of the video device 200 may communicate with a controller 200a of the video source 200. The controller 130 of the source device 100 and the controller 200a of the video device 200 may control the corresponding units thereof to perform the corresponding functions.

Figure 4A:
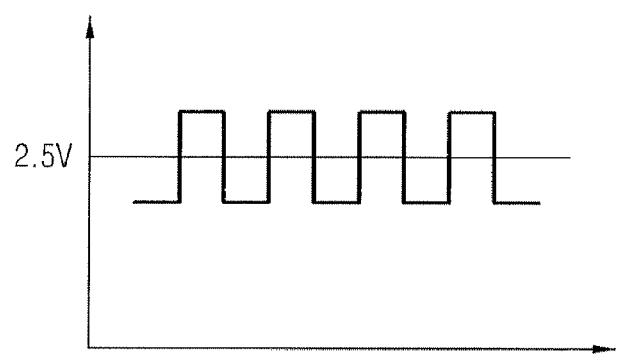
FIGS. 4A and 4B illustrate waveforms of Ethernet signals in the HDMI cable according to an embodiment of the present general inventive concept.
Figure 4B:
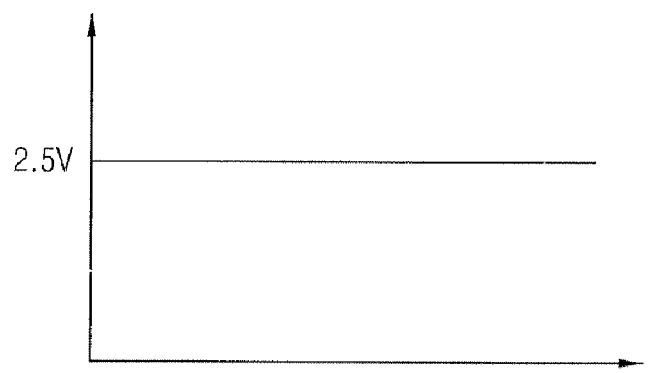

FIGS. 4A and 4B are waveform diagrams of Ethernet signals in the HDMI cable according to an embodiment of the present general inventive concept. FIG. 4A illustrates the waveform of a signal at pin 14 when pin 14 is connected to the Ethernet, and FIG. 4B illustrates the waveform of a signal at pin 14 when pin 14 is disconnected from the Ethernet.

Referring to FIG. 4A, when pin 14 is connected to the Ethernet, a digital high/low signal as well as a 2.5V DC level is sensed from pin 14 of the HDMI cable 300.

Referring to FIG. 4B, when pin 14 is not connected to the Ethernet, only the 2.5V DC level is sensed from pin 14 of the HDMI cable 300.

Here, the connection of the Ethernet can be a connection between the source device 100 and the video source 200. The connection may form a computer networking of the source device 100 and the video device 200 or the connection may be connected to a local area network. The connection can be made between the source device and the video device 200 to form the Ethernet.

The Ethernet transceiver 270 may generate the signals as illustrated in FIG. 4A. The Ethernet 140 may receive the signals through the pin 14, and the signal sensor 150 may detect the received signals transmitted through the pin 14, so that connection of the Ethernet can be determined. If the signal sensor 150 does not detect the signal through the pin 14, the signal detector 150 or the controller 130 can determine no connection of the Ethernet between the source device 100 and the video device 200. The Ethernet transceivers 140 and 270 may communicate with corresponding components (units) of the source device 100 and the video device 200 to perform the Ethernet function.

Therefore, the signal sensor 150 is disposed or formed to be connected to the terminal corresponding to the pin 14 of the HDMI cable 300. The Ethernet transceivers 140 and 270 are also disposed or formed to be connected to the terminals corresponding to the pin 14 of the HDMI cable 300. The pin 14 of the HDMI cable 300 is disposed (arranged or formed) to be connected to the signal sensor 150 and the Ethernet transceivers 140 and 270. Other pins 1-13 and 15-19 may not be connected to the signal sensor 150 and the Ethernet transceivers 140 and 270.

According to detection of the connection of the Ethernet through the pin 14 of the HDMI cable 300, the controller 130 and/or 200*a* may determine whether a cable connected between the source device 100 and the video device 200 is a non-Ethernet-ready cable or an Ethernet-ready cable, such as the HDMI cable 300, and then may generate a signal to display an image on a screen of a display unit (not illustrated) of the source device 100 or a screen of the display 230 of the video device 200 so as to notify a user of a connection state or a characteristic of a cable connected therebetween. That is, the non-Ethernet-ready cable indicates that a cable is not used to perform the Ethernet function, and the Ethernet-ready cable indicates that a cable can be used to perform the Ethernet function.

Therefore, since a user can be notified that a cable is either the non-Ethernet-ready cable or the Ethernet-ready cable, the user will not be confused between a characteristic of the cable and any other problem of the source device 100 or the video device 200 corresponding to the Ethernet function or Ethernet connection.

Here, the non-Ethernet-ready cable can be used to transmit data between the source device 100 and the video device 200 to perform the above-describe functions except the Ethernet function.

A cable connection state displaying method in the Ethernet-supporting digital interface system having the above-described configuration and its effects will be described hereinafter.

Figure 5:
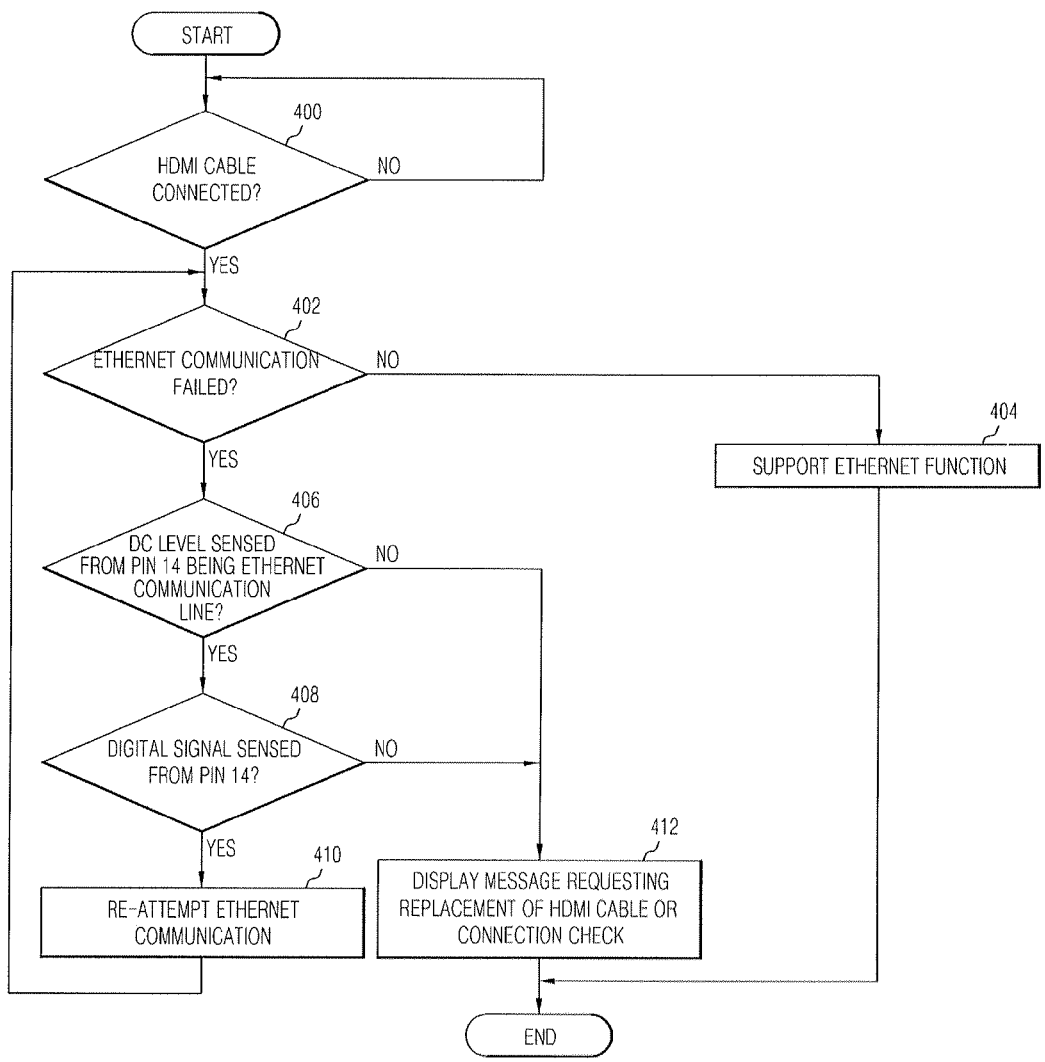
FIG. 5 is a flowchart illustrating a cable connection state displaying method in the HDMI system to support Ethernet according to an embodiment of the present general inventive concept.
Figure 6:
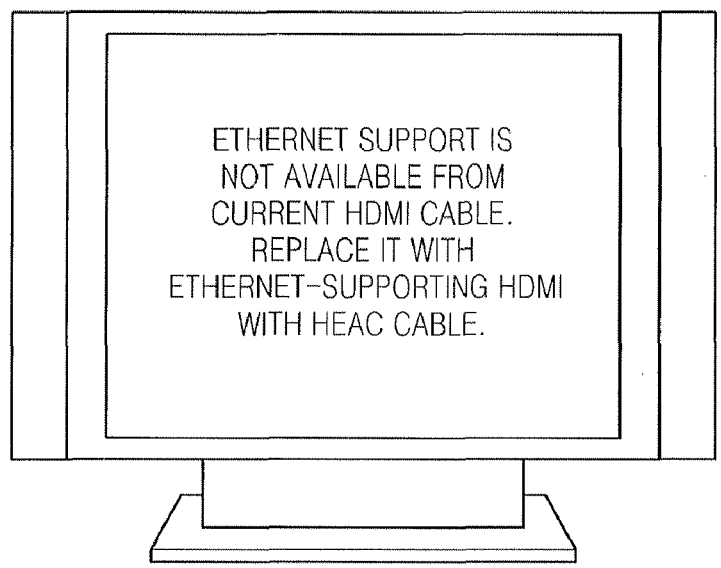
FIG. 6 illustrates a message to indicate a connection state of the HDMI cable, displayed on a screen according to an embodiment of the present general inventive concept.

FIG. 5 is a flowchart illustrating a cable connection state displaying method in the Ethernet-supporting HDMI system according to an embodiment of the present general inventive concept, and FIG. 6 illustrates a screen in which a connection state of the HDMI cable is displayed by a message according to an embodiment of the present general inventive concept.

Referring to FIG. 5, when the source device 100 and the video device 200 are power-on, it is determined whether the HDMI cable 300 is connected between the source device 100 and the video device 200 in operation 400.

The controller 130 of the source device 100 determines whether a High Plug Detect (HPD) signal of the HDMI cable 300 is "high".

If the source device 100 is connected to the video device 200 by the HDMI cable 300, the HPD signal is high (5V), and if the source device 100 is not connected to the video device 200 by the HDMI cable 300, the HPD signal is low (0V).

If the HPD signal is "high", the controller 130 determines whether EDID communication is conducted, that is, the EDID information about the video device 200 stored in the EDID storage 260 is acquired via the DDC/CEC line, during the connection of the HDMI cable 300.

This means an operation of checking whether the source device 100 exchanges information with the video device 200 via the DDC/CEC line of the HDMI.

In this manner, the controller 130 determines whether the HDMI cable 300 is connected between the source device 100 and the video device 200 by checking the communication state of the DDC/CEC line and the state ("high") of the HPD signal.

When determining that the HDMI cable 300 is connected in operation 400, an Ethernet communication is attempted via the HDMI cable 300 and it is determined whether the Ethernet communication is successful or failed in operation 402.

If the Ethernet communication is successful, an Ethernet function is supported by transmitting Ethernet signals between the source device 100 and the video device 200 via the HDMI cable in operation 404.

On the other hand, if the Ethernet communication is failed, the signal sensor 150 of the source device 100 analyzes the signal waveform of the pin 14 of the Ethernet communication line of the HDMI cable 300 and determines whether the 2.5V DC level is sensed in operation 406.

If the DC level is sensed from pin 14, the controller 130 determines whether pin 14 is connected to the Ethernet by checking whether a digital high/low signal, for example, a square-wave signal is sensed from the analysis of the signal sensor 150 about the waveform of the signal at the pin 14.

Thus, the controller 130 determines whether the digital signal is sensed from pin 14 in step 408. If the digital signal as illustrated in FIG. 4A is sensed from pin 14, the Ethernet communication is re-attempted in operation 410. Then the procedure goes back to operation 402.

If the digital signal is not sensed from the pin 14 as illustrated in FIG. 4B, a message (a warning) prompting a user to replace the current HDMI cable 300 with a proper HDMI cable or to check the connection of the HDMI cable 300 is displayed on the video device 200 as illustrated in FIG. 6 in operation 412. In the case where the user attempts an Ethernet setting in a menu of the video device 200 with the HDMI cable 300 connected, if an Ethernet connection is failed, the source device 100 outputs a message as a video signal, considering that the a cable, for example, the HDMI cable 300, causes the Ethernet connection failure. Thus the user may check the HDMI cable 300 and exchange a current cable with another HDMI cable. If pin 14 is not connected to the Ethernet through the Ethernet transceivers 130 and 270 in the HDMI cable 300, a message notifying that the Ethernet function is not available via a cable, for example, the HDMI cable, due to an appropriate current connection state of the HDMI cable 300 is displayed to the user through a User Interface (UI).

Therefore, the user is guided to replace the HDMI cable 300 with a normal HDMI cable.

Meanwhile, if the DC level is not sensed from pin 14 in operation 406, the message (warning) prompting the user to replace the current HDMI cable 300 with a proper cable or to check the connection of the HDMI cable 300 is displayed on the video device 200 in step 412.

Figure 7:
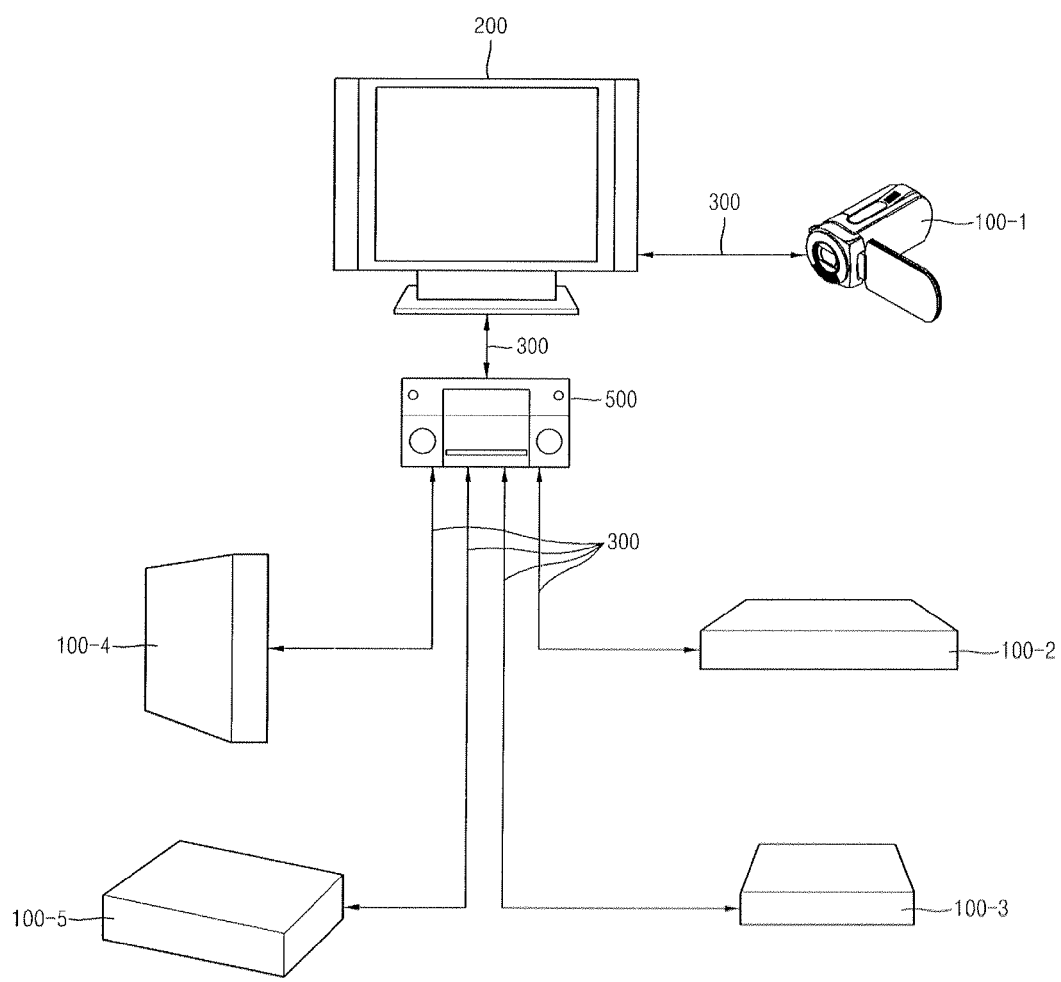
FIG. 7 is a mimetic diagram of an HDMI system to support Ethernet according to an embodiment of the present general inventive concept.

FIG. 7 is a mimetic diagram illustrating a configuration of an Ethernet-supporting HDMI system according to an embodiment of the present general inventive concept.

Referring to FIG. 7, in the HDMI system, a plurality of source devices 100-1 to 100-5 to provide digital contents are connected to the video device 200 to process and display the digital contents received from the source devices 100-1 to 100-5 via a plurality of HDMI cables 300.

Each of the source devices 100-1 to 100-5 is a multimedia transmitter to transmit digital content data to the video device 200 via an HDMI cable 300. The multimedia transmitter may be a camcorder, a digital camera, a DVD player, a BD player, a PS3, a set top box, a mobile phone, or the like.

The video device 200 is a receiver to receive and display data received from each of the source devices 100-1 to 100-5 on a screen thereof. The video device 200 may be a monitor, a HDTV, or the like.

A repeater 500 is provided between the video device 200 and the source devices 100-2 to 100-5 that are connected via a plurality of HDMI cables 300, to extend digital signal transmission.

Also, in the case where the Ethernet function is used by connecting the source devices 100-1 to 100-5 to the video device 200 via the plurality of HDMI cables 300, an inappropriate connection state of an HDMI cable 300 is notified visually on the video device 200.

In this case, the connection states and types of the source devices 100-1 to 100-5 may be identified by physical addresses and logical addresses received through CEC lines, respectively. Also, the names and connection states of the source devices 100-1 to 100-5 may be identified from a Source Product Description (SPD) infoframe and Product Identifiers (IDs) and model types set in EDID data. The connection states of the HDMI cables 300 as identified in the above manner are displayed on the screen of the video device 200. To elaborate, inappropriate HDMI cables 300 between the source devices 100-1 to 100-5 and the video device 200 are notified in a connection diagram on the screen of the display 200, as illustrated in FIG. 8, by marking the connections of the inappropriate HDMI cables 300 in a predetermined color or making them flicker.

Figure 8:
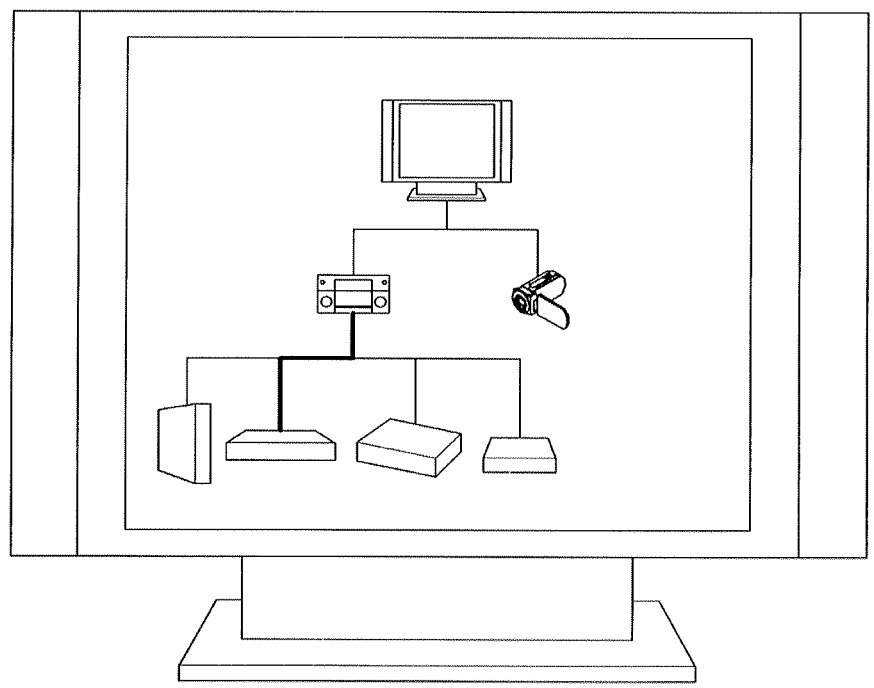
FIG. 8 illustrates a connection diagram to indicate connection states of HDMI cables according to an embodiment of the present general inventive concept.

When an HDMI cable 300 is connected, a predetermined message is output to the user as illustrated in FIG. 6, or inappropriate HDMI cables 300 are displayed to the user in the form of a connection diagram as illustrated in FIG. 8. When the user connects the source device 100 or the source devices 100-1 to 100-5 to the video device 200, turns on the source device 100 or the source devices 100-1 to 100-5 and the video device 200, a decision is made as to whether the HDMI cable(s) 300 are properly connected between the source device 100 or the source devices 100-1 to 100-5 at the time when normal screen displaying is available. If there is any HDMI cable 300 inappropriate for the HEAC function, a message (a warning) prompting the user to replace the inappropriate HDMI cable 300 with a normal HDMI cable 300 is output to the user and the inappropriate HDMI cable 300 to be replaced is accurately notified by displaying a connection diagram between the source device 100 or the source devices 100-1 to 100-5 and the video device 200.

To implement these schemes, information about whether the HDMI cable(s) 300 is appropriate, as determined at a time when it may be determined whether the HEAC function of the HDMI cable(s) 300 is available or as determined before power-off may be displayed on the screen. To elaborate, in a state where it may be determined whether the HEAC function is available from the HDMI cable(s) 300 connected between the video device 200 and the source device 100 or the source devices 100, it is determined whether the HDMI cable(s) 300 is appropriate and the source device 100 or the source devices 101-1 to 101-5 transmit the determination result to the video device 200. Then the video device 200 may display the positions of inappropriate HDMI cables 300 in a connection diagram to the user.

Also, when the user attempts to use the HEAC function and controls a function on/off in a related menu, a message may be displayed on the screen.

It may be determined that the technology according to the embodiments of the present invention is applied, when a message is output from the video device 200 when the HEAC function is used while a general HDMI cable 300 other than an HDMI with HEAC cable is connected, when a message indicating whether an HDMI 300 cable is appropriate or a message prompting the user to replace the existing HDMI cable 300 with a standard HDMI cable 300 is issued to the user, or when an inappropriate HDMI cable 300 is indicated by displaying connection states of HDMI cables 300 to thereby to request a cable replacement or connection check to the user.

As is apparent from the above description, a digital cable connection supporting an Ethernet function and a cable connection state displaying method therefore according to embodiments of the present invention display an inappropriate connection of an HDMI cable on a screen by a message or a diagram, when a user intends to use the Ethernet function by connecting the HDMI cable. Therefore, even an ordinary user without specialized knowledge in HDMI cables is guided to select an appropriate HDMI cable. Also in case of a plurality of connected HDMI cables, the position of an inappropriate HDMI cable is visually notified to the user. Further, even though it is difficult to distinguish a general HDMI cable from an HDMI with HEAC cable, the user may identify an inappropriate HDMI cable accurately.

Although a few embodiments of the present general inventive concept have been shown and described, it would be appreciated by those skilled in the art that changes may be made in these embodiments without departing from the principles and spirit of the general inventive concept, the scope of which is defined in the claims and their equivalents.

What is claimed is:

1. A method to display a cable connection state in a digital interface system, the method comprising:
   providing a connection between a source device and a video device by a digital interface cable to support Ethernet communication therebetween;
   sensing a signal from an Ethernet communication line of the digital interface cable;
   determining whether the sensed signal from the Ethernet communication line includes a DC level and a digital signal; and
   generating a signal to display a connection diagram including the source device and at least one other source device connected to the video device, and if it is determined that the sensed signal from the Ethernet communication line does not include the DC level or the digital signal, to display an indication that the digital interface cable is inappropriate and an indication of a position of the inappropriate digital interface cable in the connection diagram,
   wherein the Ethernet communication line is a $14^{th}$ pin of the digital interface cable,
   wherein the determination comprises analyzing a signal waveform of the $14^{th}$ pin, if the Ethernet communication has failed, and
   wherein the displaying further comprises generating the signal to display a connection diagram indicating connection states and names of the source device and the at least one other source device using at least one of Consumer Electronics Control (CEO) information, a Source Product Description (SPD) infroframe, and Extended Display Identification Data (EDID) information of each of digital interface devices connected to the plurality of source devices.

2. The method according to 1, wherein the displaying comprises generating the signal to display a message prompting a user to replace the digital interface cable with another digital interface cable or to check a connection of the digital interface cable on the video device.

3. A digital interface system comprising:
a digital interface cable to provide a connection between a source device and a video device to support Ethernet communication;
a signal sensor provided in the source device to sense a signal from an Ethernet communication line of the digital interface cable; and
a controller to control a connection diagram including the source device and at least one other source device connected to the video device to be displayed, to determine whether the sensed signal from the Ethernet communication line includes a DC level and a digital signal, and if the sensed signal does not include the DC level or the digital signal, to control an indication that the digital interface cable is inappropriate and a position of the inappropriate digital interface cable to be displayed in the connection diagram,
wherein the Ethernet communication line is a $14^{th}$ pin of the digital interface cable,
wherein the controller determines whether the sensed signal includes the DC level and the digital signal if the Ethernet communication has failed,
wherein the controller determines that the $14^{th}$ pin is not connected to an Ethernet, if the digital signal is not sensed from the $14^{th}$ pin, and
wherein the controller determines a connection diagram indicating connection states and names of the source device and the at least one other source device using at least one of Consumer Electronics Control (CEC) information, a Source Product Description (SPD) infroframe, and Extended Display Identification Data (EDID) information of each of digital interface devices connected to the plurality of source devices.

4. The digital interface system according to 3, wherein the controller controls a message prompting a user to replace the digital interface cable with another digital interface cable or to check a connection of the digital interface cable on the video device to be displayed.

5. The digital interface system according to 3, wherein the controller controls the connection state of the digital interface cable to be displayed in the connection diagram at a time of connecting the digital interface cable, at a time of changing an Ethernet setting function in a menu, or at a time of using the device by power-on.

6. The digital interface system according to claim 4, wherein the controller controls the connection state of the digital interface cable to be displayed the message at a time of connecting the digital interface cable, at a time of changing an Ethernet setting function in a menu, or at a time of using the device by power-on.

7. A digital interface system comprising:
a source device having a terminal unit having a plurality of terminals, a signal sensor connected to a fourteenth pin of the terminals of the terminal unit to detect a signal, and a controller to generate a signal corresponding to the detected signal; and
a cable having a plurality of pins connectable to corresponding terminals of the terminal unit, the plurality of pins having a fourteenth pin to transmit the signal to the source device,
wherein the controller controls a connection diagram including the source device and at least one other source device connected to the video device to be displayed, determines whether the detected signal includes a DC level and a digital signal, and if the detected signal does not include the DC level or the digital signal, generates a signal to display an indication that the cable is inappropriate and to display a position the inappropriate cable in the connection diagram,
wherein an Ethernet communication line is the fourteenth pin of the cable,
wherein the controller determines whether the detected signal includes the DC level and the digital signal if the Ethernet communication has failed,
wherein the controller determines that the fourteenth pin is not connected to an Ethernet, if the digital signal is not detected from the fourteenth pin, and
wherein the controller determines a connection diagram indicating connection states and names of the source device and the at least one other source device using at least one of Consumer Electronics Control (CEC) information, a Source Product Description (SPD) infroframe, and Extended Display Identification Data (EDID) information of each of digital interface devices connected to the plurality of source devices.

8. The digital interface system of claim 7, wherein:
the controller generates the signal corresponding to the detected signal to display an image representing that the cable is a non Ethernet-ready cable when the detected signal does not include the DC level or the digital signal.

* * * * *